(12) United States Patent
Pan et al.

(10) Patent No.: US 10,601,657 B2
(45) Date of Patent: Mar. 24, 2020

(54) INSTANCE NODE MANAGEMENT METHOD AND MANAGEMENT DEVICE

(71) Applicant: HUAWEI TECHNOLOGIES CO., LTD., Shenzhen, Guangdong (CN)

(72) Inventors: Fangmin Pan, Hangzhou (CN); Tong Zhou, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 167 days.

(21) Appl. No.: 15/783,500

(22) Filed: Oct. 13, 2017

(65) Prior Publication Data
US 2018/0048522 A1 Feb. 15, 2018

Related U.S. Application Data

(63) Continuation of application No. PCT/CN2015/092667, filed on Oct. 23, 2015.

(30) Foreign Application Priority Data

Apr. 16, 2015 (CN) .......................... 2015 1 0180650

(51) Int. Cl.
*G06F 11/00* (2006.01)
*H04L 12/24* (2006.01)
(Continued)

(52) U.S. Cl.
CPC ...... *H04L 41/0846* (2013.01); *G06F 9/45558* (2013.01); *G06F 11/1446* (2013.01);
(Continued)

(58) Field of Classification Search
CPC ............. G06F 11/3006; G06F 11/2041; G06F 11/203; G06F 11/202; G06F 11/2023
See application file for complete search history.

(56) References Cited

U.S. PATENT DOCUMENTS 8,595,192 B1 11/2013 Manmohan
9,569,277 B1 * 2/2017 Cropper ................ G06F 9/5083
(Continued)

FOREIGN PATENT DOCUMENTS

CN 102497288 6/2012
CN 102591741 7/2012
(Continued)

OTHER PUBLICATIONS

International Search Report dated Jan. 22, 2016 in corresponding International Patent Application No. PCT/CN2015/092667.
(Continued)

*Primary Examiner* — Charles Ehne
(74) *Attorney, Agent, or Firm* — Fish & Richardson P.C.

(57) ABSTRACT

An instance node management method is disclosed, which includes: creating a primary instance node for an application hosted on a cloud platform to run an instance of the application; determining, according to running start information of the primary instance node, a minimum resource configuration specification required by a secondary instance node of the application, where the secondary instance node is configured to replace the primary instance node when the primary instance node is faulty; and creating the secondary instance node according to the minimum resource configuration specification. The instance node management method as provided can reduce occupancy of a spare resource and increase an application hosting capability and scale on the cloud platform.

15 Claims, 8 Drawing Sheets

(51) Int. Cl.
*H04L 29/08* (2006.01)
*G06F 9/455* (2018.01)
*G06F 11/20* (2006.01)
*G06F 11/30* (2006.01)
*G06F 11/14* (2006.01)

(52) U.S. Cl.
CPC ........ *G06F 11/203* (2013.01); *G06F 11/2023* (2013.01); *G06F 11/2041* (2013.01); *G06F 11/3006* (2013.01); *H04L 29/08* (2013.01); *H04L 41/0663* (2013.01); *H04L 41/0668* (2013.01); *H04L 67/1097* (2013.01); *G06F 2009/4557* (2013.01); *G06F 2009/45562* (2013.01); *G06F 2009/45575* (2013.01); *H04L 41/0886* (2013.01); *H04L 67/10* (2013.01)

(56) References Cited

U.S. PATENT DOCUMENTS

| | | | | |
|---|---|---|---|---|
| 10,152,268 | B1* | 12/2018 | Chakraborty | G06F 3/065 |
| 2004/0243915 | A1* | 12/2004 | Doyle | G06F 11/203 |
| | | | | 714/796 |
| 2008/0189468 | A1* | 8/2008 | Schmidt | G06F 11/203 |
| | | | | 711/6 |
| 2012/0136833 | A1 | 5/2012 | Bartholomy et al. | |
| 2013/0097296 | A1* | 4/2013 | Gehrmann | G06F 9/4856 |
| | | | | 709/223 |
| 2014/0007097 | A1 | 1/2014 | Chin et al. | |
| 2014/0012721 | A1* | 1/2014 | Chittigala | G06F 9/50 |
| | | | | 705/35 |
| 2014/0201564 | A1 | 7/2014 | Jagtiani et al. | |
| 2015/0082308 | A1 | 3/2015 | Kiess et al. | |

FOREIGN PATENT DOCUMENTS

| | | |
|---|---|---|
| CN | 103077079 | 5/2013 |
| CN | 103810015 | 5/2014 |
| CN | 104836850 | 8/2015 |
| WO | WO2014080438 | 5/2014 |

OTHER PUBLICATIONS

Extended European Search Report, dated Jan. 25, 2018, in European Application No. 15889000.4 (11 pp.).

International Search Report, dated Jan. 22, 2016, in International Application No. PCT/CN2015/092667 (4 pp.).

Written Opinion of the International Searching Authority, dated Jan. 22, 2016, in International Application No. PCT/CN2015/092667 (8 pp.).

Office Action, dated Aug. 16, 2017, in Chinese Application No. 201510180650.3 (6 pp.).

\* cited by examiner

INSTANCE NODE MANAGEMENT METHOD AND MANAGEMENT DEVICE

CROSS-REFERENCE TO RELATED APPLICATIONS

This application is a continuation of International Patent Application No. PCT/CN2015/092667 filed on Oct. 23, 2015, which claims priority to Chinese Patent Application No. 201510180650.3 filed on Apr. 16, 2015. The disclosures of the aforementioned applications are hereby incorporated by reference in their entireties.

TECHNICAL FIELD

The present disclosure relates to the field of cloud computing technologies, and specifically, to an instance node management method and a management device.

BACKGROUND

In the era of cloud computing, massive applications and services all are hosted on a cloud platform. In addition to ensuring high availability of the cloud platform itself, the cloud platform still needs to provide assurance of high availability for the applications and services hosted on the cloud platform. In an existing solution, high availability of an application or a service is usually implemented by deploying two primary instance nodes or by deploying a primary instance node and a secondary instance node. For a solution implementing high availability by using two primary instance nodes, instances of multiple applications are parallel, and all instance nodes can normally receive external request information and process the external request information. If an instance node of the instance nodes is faulty, load born by the instance node is shared by another instance node. A solution in which a primary instance node and a secondary instance node are used is a highly reliable solution that is most dominant in the industry. An application instance of a primary instance node is backed up on a secondary instance node. When the primary instance node is normal, all external requests are used for accessing the primary instance node, and the external requests are switched to the secondary instance node only when the primary instance node is faulty and cannot run normally.

It can be seen from the foregoing that, in the solution in which a primary instance node and a secondary instance node are used, the secondary instance node occupies a resource that is absolutely the same as a resource occupied by the primary instance node, but is in a standby state all the time, which causes a waste of physical resources. However, in the solution in which two primary instance nodes are used, a resource utilization rate of the two primary instance nodes cannot reach 50%. If the resource utilization rate reaches 50%, when a single point is faulty, all pressure is concentrated on the other active primary instance node, and excessively high pressure causes that a service cannot run normally. As a result, more usage wastes of node resources are caused.

SUMMARY

Embodiments of the present disclosure provide an instance node management method, which, on a basis of ensuring high availability of an application that is hosted on a cloud platform, can reduce occupancy of a spare resource and increase an application hosting capability and scale on the cloud platform. The embodiments of the present disclosure further provide a corresponding management device.

A first aspect of the present disclosure provides an instance node management method, where the method is applied to a management device of a cloud platform, and the method includes:

creating a primary instance node for an application hosted on the cloud platform, where the primary instance node is configured to run an instance of the application;

determining, according to running start information of the primary instance node, a minimum resource configuration specification required by a secondary instance node of the application, where the secondary instance node is configured to replace, when the primary instance node is faulty, the primary instance node to run the instance of the application; and creating the secondary instance node according to the minimum resource configuration specification, where a resource configuration specification of the secondary instance node is less than a resource configuration specification of the primary instance node.

With reference to the first aspect, in a first possible implementation manner, after the creating the secondary instance node according to the minimum resource configuration specification, the method further includes:

when the primary instance node is faulty, adjusting the resource configuration specification of the secondary instance node to be the same as the resource configuration specification of the primary instance node, and setting the secondary instance node as a working instance node to replace the primary instance node to run the instance of the application.

With reference to the first possible implementation manner of the first aspect, in a second possible implementation manner, after the adjusting the resource configuration specification of the secondary instance node to be the same as the resource configuration specification of the primary instance node, the method further includes:

creating a secondary instance node for the application again according to the minimum resource configuration specification.

With reference to the first possible implementation manner of the first aspect, in a third possible implementation manner, after the adjusting the resource configuration specification of the secondary instance node to be the same as the resource configuration specification of the primary instance node, the method further includes:

repairing the faulty primary instance node to obtain the repaired primary instance node; and adjusting a resource configuration specification of the repaired primary instance node to be the same as the minimum resource configuration specification, and setting the repaired primary instance node as the secondary instance node to replace, when the working instance node is faulty, the working instance node to run the instance of the application.

With reference to the first aspect or any one of the first to third possible implementation manners of the first aspect, in a fourth possible implementation manner, after the determining a minimum resource configuration specification required by a secondary instance node of the application, the method further includes:

acquiring accesses of the application by user equipment; and the creating the secondary instance node according to the minimum resource configuration specification includes:

creating at least two secondary instance nodes for the application according to the minimum resource configuration specification when the accesses of the application exceed a preset threshold, where a resource configuration specification of each created secondary instance node is the same as the minimum resource configuration specification.

With reference to the first aspect or any one of the first to third possible implementation manners of the first aspect, in a fifth possible implementation manner, after the creating the secondary instance node according to the minimum resource configuration specification, the method further includes:

monitoring the created secondary instance node of the application; and when it is learned, by detecting, that the secondary instance node is faulty, creating a secondary instance node having a same quantity as the faulty secondary instance node.

With reference to the first aspect or any one of the first to third possible implementation manners of the first aspect, in a sixth possible implementation manner, after the creating the secondary instance node according to the minimum resource configuration specification, the method further includes:

detecting a resource quantity required for running the instance of the application; and adjusting the resource configuration specification of the created secondary instance node of the application according to the required resource quantity.

A second aspect of the present disclosure provides a management device of a cloud platform, where the management device includes:

a first creating module, configured to create a primary instance node for an application hosted on the cloud platform, where the primary instance node is configured to run an instance of the application;

a determining module, configured to determine, according to running start information of the primary instance node created by the first creating module, a minimum resource configuration specification required by a secondary instance node of the application, where the secondary instance node is configured to replace, when the primary instance node is faulty, the primary instance node to run the instance of the application; and a second creating module, configured to create the secondary instance node according to the minimum resource configuration specification determined by the determining module, where a resource configuration specification of the secondary instance node is less than a resource configuration specification of the primary instance node.

With reference to the second aspect, in a first possible implementation manner, the management device further includes:

a first adjustment module, configured to: when the primary instance node is faulty, adjust the resource configuration specification of the secondary instance node created by the second creating module to be the same as the resource configuration specification of the primary instance node, and set the secondary instance node as a working instance node to replace the primary instance node to run the instance of the application.

With reference to the first possible implementation manner of the second aspect, in a second possible implementation manner, the second creating module is further configured to create a secondary instance node for the application again according to the minimum resource configuration specification.

With reference to the first possible implementation manner of the second aspect, in a third possible implementation manner, the management device further includes a repairing module, where the repairing module is configured to repair the faulty primary instance node to obtain the repaired primary instance node; and the first adjustment module is further configured to adjust a resource configuration specification of the repaired primary instance node to the minimum resource configuration specification required by the application, and set the repaired primary instance node as the secondary instance node to replace, when the working instance node is faulty, the working instance node to run the instance of the application.

With reference to the second aspect or any one of the first to third possible implementation manners of the second aspect, in a fourth possible implementation manner, the management device further includes an acquiring module, where the acquiring module is configured to acquire accesses of the application by user equipment; and the second creating module is specifically configured to: when the accesses acquired by the acquiring module, of the application exceed a preset threshold, create at least two secondary instance nodes for the application according to the minimum resource configuration specification determined by the determining module, where a resource configuration specification of each created secondary instance node is the same as the minimum resource configuration specification.

With reference to the second aspect or any one of the first to third possible implementation manners of the second aspect, in a fifth possible implementation manner, the management device further includes a monitoring module, where the monitoring module is configured to monitor the secondary instance node, created by the second creating module, of the application; and the second creating module is further configured to: when the monitoring module learns, by detecting, that the secondary instance node is faulty, create a secondary instance node having a same quantity as the faulty secondary instance node.

With reference to the second aspect or any one of the first to third possible implementation manners of the second aspect, in a sixth possible implementation manner, the management device further includes a detection module and a second adjustment module, where the detection module is configured to detect a resource quantity required for running the instance of the application; and the second adjustment module is configured to adjust the resource configuration specification of the created secondary instance node of the application according to the required resource quantity detected by the detection module.

According to the embodiments of the present disclosure, a primary instance node is created for an application hosted on a cloud platform, where the primary instance node is configured to run an instance of the application; a minimum resource configuration specification required by a secondary instance node of the application is determined according to running start information of the primary instance node, where the secondary instance node is configured to replace, when the primary instance node is faulty, the primary instance node to run the instance of the application; and the secondary instance node is created according to the minimum resource configuration specification, where a resource configuration specification of the secondary instance node is less than a resource configuration specification of the primary instance node. Compared with the prior art in which a secondary instance node needs to occupy a same resource as a primary instance node to ensure high availability of an application on a cloud platform, on a basis of ensuring high availability of an application that is hosted on a cloud platform, the instance node management method provided by the embodiments of the present disclosure can reduce occupancy of a spare resource and increase an application hosting capability and scale on the cloud platform.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and other drawings may be derived from these accompanying drawings.

DESCRIPTION OF EMBODIMENTS

Figure 1:
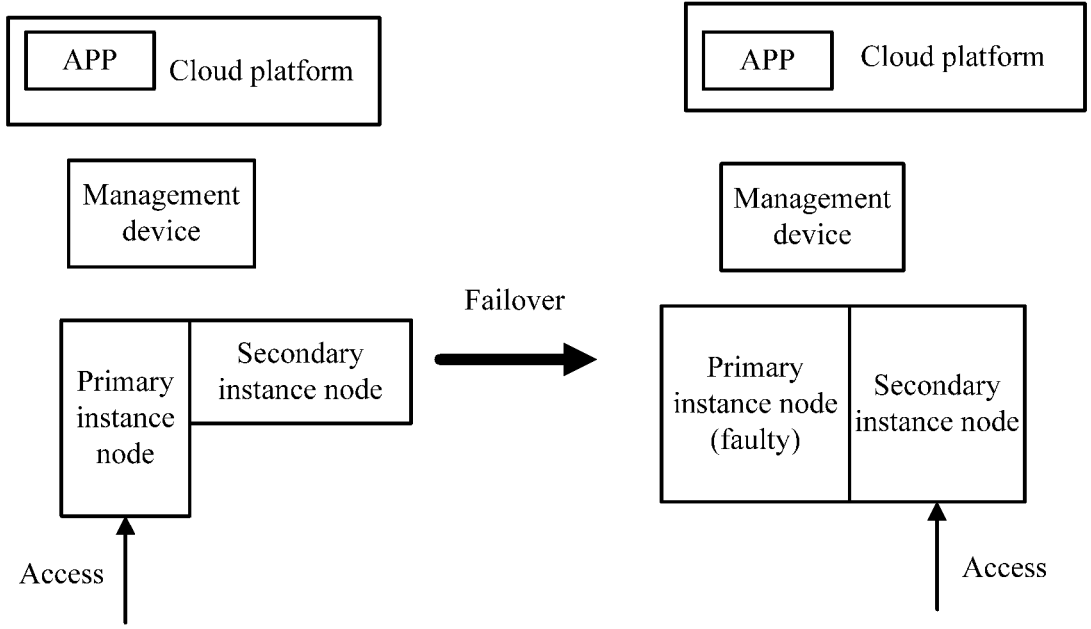
FIG. 1 is a schematic diagram of an embodiment of an instance node management method according to the embodiments of the present disclosure.

The embodiments of the present disclosure provide an instance node management method, which, on a basis of ensuring high availability of an application that is hosted on a cloud platform, can reduce occupancy of a spare resource and increase an application hosting capacity and size on the cloud platform. The embodiments of the present disclosure further provide a corresponding management device. The following separately provides detailed descriptions.

To make a person skilled in the art understand the solutions in the present disclosure better, the following describes the technical solutions in the embodiments of the present disclosure with reference to the accompanying drawings in the embodiments of the present disclosure. Apparently, the described embodiments are merely a part rather than all of the embodiments of the present disclosure. Massive applications can be hosted on a cloud platform. To ensure high-availability performance of each application, a primary instance node and a secondary instance node need to be created for each application in an operating environment of the cloud platform, where the primary instance node is configured to run an instance of an application, and the secondary instance node is configured to replace, when the primary instance node is faulty, the primary instance node to run the instance of the application. A management device on the cloud platform manages both the primary instance node and the secondary instance node. Each of the primary instance node and the secondary instance node is actually a virtual machine or function node allocated by the management device to the application, where a granularity of the function node is less than that of the virtual machine, and both the primary instance node and the secondary instance node can use resources on the cloud platform. The resources on the cloud platform refer to hardware resources provided by many physical hosts, and include but are not limited to a core quantity of a central processing unit (Central Processing Unit, CPU), a memory size, a hard disk size, network bandwidth, and the like.

In the embodiments of the present disclosure, after a user hosts an application on a cloud platform, a primary instance node that runs an instance of the application is created for the application hosted by the user on the cloud platform; a minimum resource configuration specification required by a secondary instance node of the application is determined according to running start information of the primary instance node; and the secondary instance node is created according to the minimum resource configuration specification, so that a resource configuration specification of the secondary instance node is the same as the minimum resource configuration specification, and the resource configuration specification of the secondary instance node is less than a resource configuration specification of the primary instance node, where the secondary instance node is configured to replace, when the primary instance node is faulty, the primary instance node to run the instance of the application. A resource configuration specification of an instance node is used to indicate a resource quantity allocated to the instance node, such as a core quantity of a CPU, a memory size, a hard disk size, or network bandwidth allocated to the instance node. The minimum resource configuration specification is used to indicate a minimum resource quantity that is required for starting or running the instance of the application. The instance of the application can be understood as a copy or mirror of an executable version of the application. The cloud platform can create one or more instances for one application, and each instance of the application may be specifically an independent process or thread.

The user may be an application operator. The running start information of the primary instance node may indicate a basic resource required for running the instance of the application, such as a core quantity of a CPU, a memory size, a hard disk size, or network bandwidth required when the primary instance node starts operating. The minimum resource configuration specification required by the secondary instance node may refer to specification information such as a core quantity of a CPU, a memory size, a hard disk size, or network bandwidth required when the secondary instance node is configured to run the application.

As shown in FIG. 1, when a primary instance node is normal, the primary instance node provides a service for access by user equipment; when the primary instance node is faulty, a management device switches the access by the user equipment to a secondary instance node, and sets the secondary instance node of an application as a working instance node that provides a service for the access by the user equipment; and adjusts a resource configuration specification of the working instance node to be the same as a resource configuration specification of the primary instance node. Certainly, instead of adjusting the resource configuration specification of the working instance node to be the same as the resource configuration specification of the primary instance node, the management device may adjust the resource configuration specification of the working instance node to be slightly greater or less than the resource configuration specification of the primary instance node.

Figure 2:
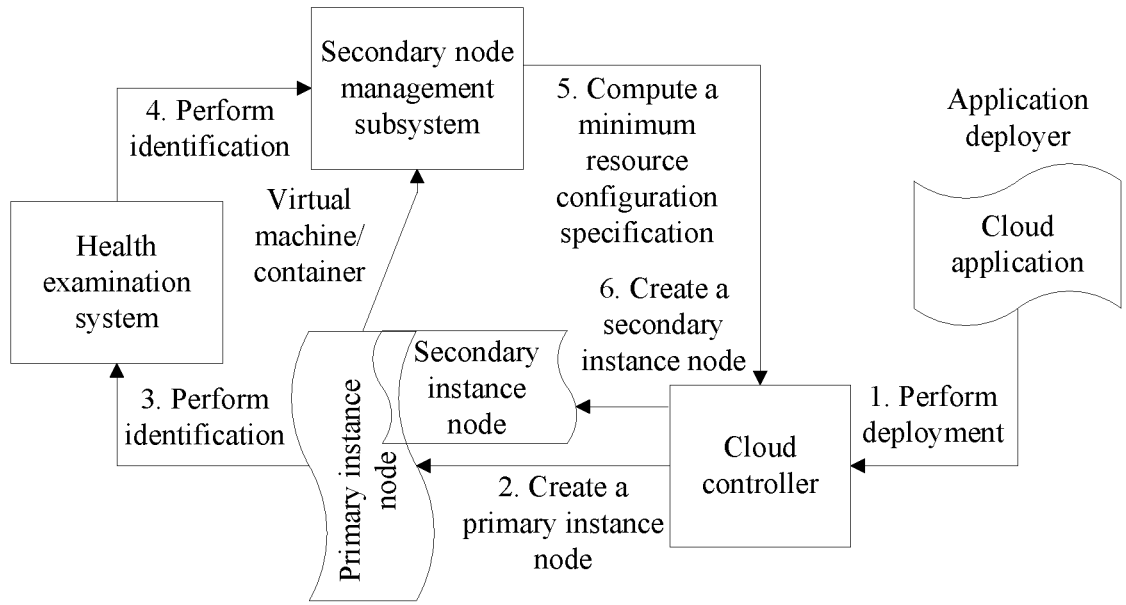
FIG. 2 is a schematic diagram of another embodiment of an instance node management method according to the embodiments of the present disclosure.

The management device in in FIG. 1 present disclosure may include a cloud controller, a secondary node management subsystem, and a health examination system in FIG. 2, as shown in FIG. 2:

Step 1: An application deployer deploys a cloud application on a cloud platform by using the cloud controller.

Step 2: The cloud controller creates, according to a specification of the application, a primary instance node that runs the application, where the primary instance node has an initial resource configuration specification, the initial resource configuration specification is usually a system default or is usually set by a developer/maintainer according to experience, and the initial resource configuration specification can ensure that sufficient resources can be used by the primary instance node to carry an instance of the application.

Step 3: After creation of the primary instance node is complete, the health examination system identifies the primary instance node of the newly added cloud application.

Step 4: The health examination system instructs the secondary node management subsystem to compute a minimum resource configuration specification.

Step 5: The secondary node management subsystem computes a minimum resource configuration specification required by a secondary instance node according to running information of the primary instance node that has been started and that runs normally, where the running information may indicate a resource that is actually occupied for running the instance of the application normally, the minimum resource configuration specification indicates a minimum resource quantity that is required for starting or running the instance of the application, and the minimum resource configuration specification is usually far less than the initial resource configuration specification of the primary instance node.

Step 6: The cloud controller creates a secondary instance node according to the obtained minimum resource configuration specification, where a resource configuration specification of the created secondary instance node is the same as the minimum resource configuration specification.

Figure 3:
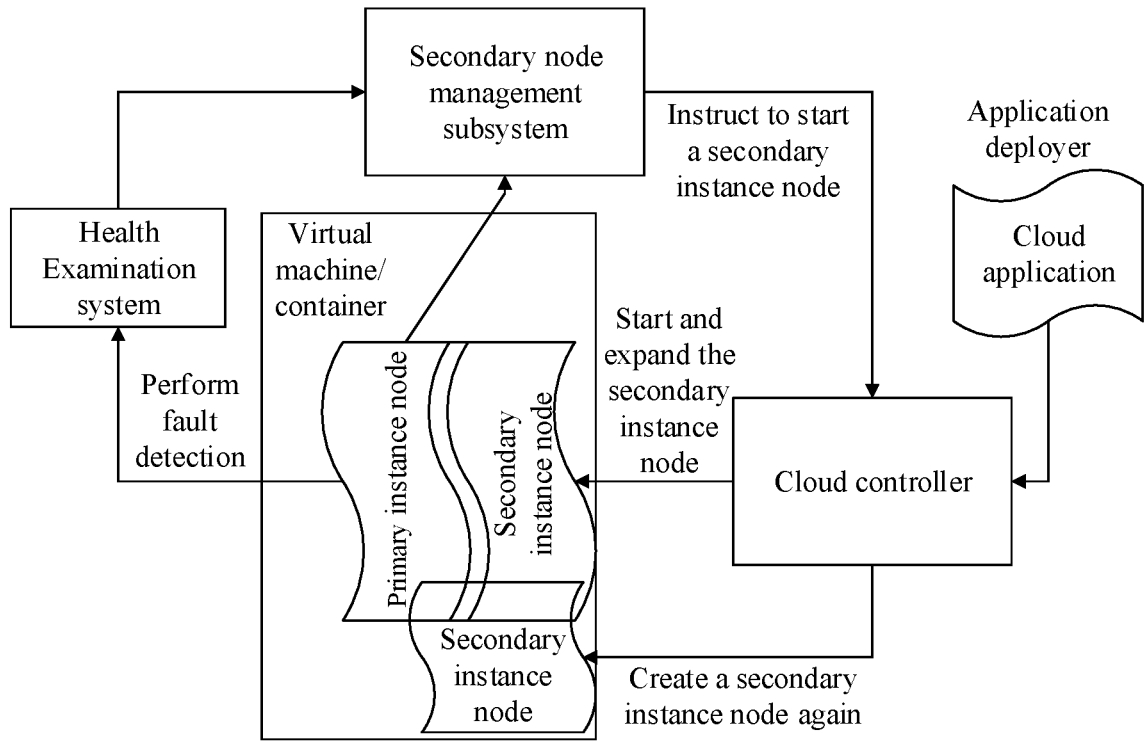
FIG. 3 is a schematic diagram of another embodiment of an instance node management method according to the embodiments of the present disclosure.

FIG. 3 shows a procedure of an example of processing performed when a primary instance node is faulty. When detecting that a primary instance node is faulty, a health examination system notifies a secondary node management subsystem of such case. The secondary node management subsystem instructs a cloud controller to start and expand a minimum secondary instance node, uses an expanded secondary instance node as a conventional instance node to replace the primary instance node of an application to run an instance of the application, and creates a secondary instance node according to a minimum resource configuration specification. The conventional instance node herein may also be referred to as a working instance node and refers to an instance node that runs the instance of the application currently.

Figure 4:
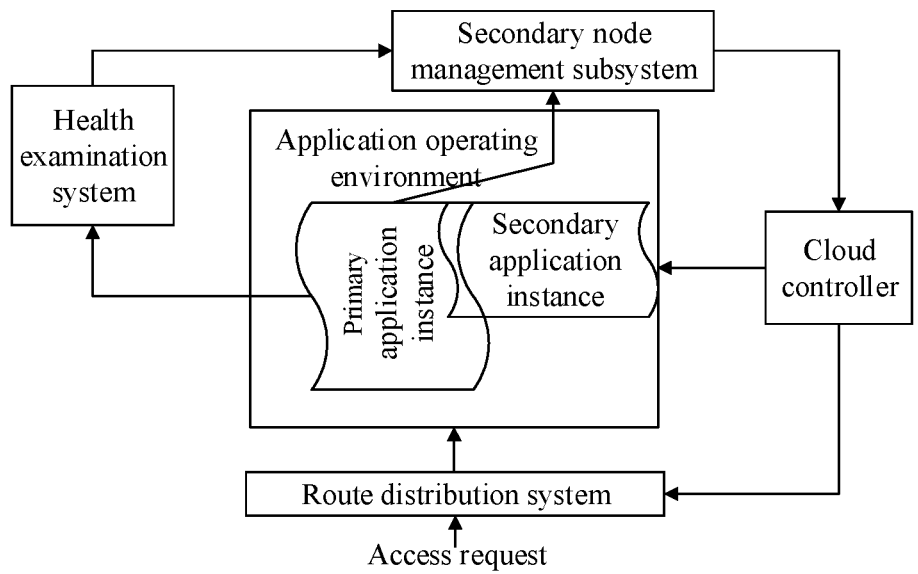
FIG. 4 is a schematic diagram of another embodiment of an instance node management method according to the embodiments of the present disclosure.

As shown in FIG. 4, in another embodiment of an instance node management method provided by embodiments of the present disclosure, a cloud platform includes the following several parts: a cloud controller, a health examination system, a secondary node management subsystem, a route distribution system, and an application operating environment. Each of the cloud controller, the health examination system, the secondary node management subsystem, and the route distribution system may be understood as a constituent part of a management device. The management device has functions of the cloud controller, the health examination system, the secondary node management subsystem, and the route distribution system.

Functions of all the parts include the following:

The secondary node management subsystem: on the cloud platform, the secondary node management subsystem is mainly responsible for computing a minimum resource configuration specification required by a secondary instance node, instructing the cloud controller to start and expand the secondary instance node when a primary instance node is faulty, and then after the secondary instance node as expanded is started as a conventional working instance node, creating a secondary instance node again according to the minimum resource configuration specification.

The expanding the secondary instance node to form a conventional working instance node refers to adjusting a resource configuration specification of the secondary instance node to be the same as a resource configuration specification of the primary instance node. It should be noted that the "same" described in this embodiment of the present disclosure does not refer to being absolutely the same in numerical value. In an actual application, a specific error is allowed, for example, the resource configuration specification of the secondary instance node is slightly greater or less than or substantially the same as the resource configuration specification of the primary instance node.

Figure 5:
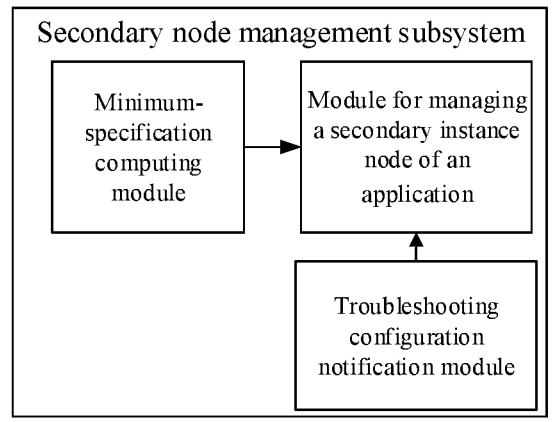
FIG. 5 is a schematic diagram of another embodiment of an instance node management method according to the embodiments of the present disclosure.

As shown in FIG. 5, a secondary node management subsystem mainly includes the following three modules: a minimum-specification computing module, a module for managing a secondary instance node of an application, and a troubleshooting configuration notification module.

The minimum-specification computing module mainly acquires, when an application is deployed on a cloud platform for the first time and after a primary instance node of the application has been started successfully, a minimum configuration specification of a required resource in a process of initializing the primary instance node. The specification includes but is not limited to a core quantity of a CPU, a memory size, a hard disk size, network bandwidth, and the like. A cloud controller is to be notified of the specification, and the specification is recorded on the cloud controller and used as a specification basis of subsequently starting a new secondary instance node.

The module for managing a secondary instance node of an application is mainly configured to determine and check a case of a secondary instance node of the application. A quantity and an operating status of the secondary instance node are managed by the module. When sustained pressure of the application is relatively high, the system can determine a quantity of minimum secondary instance nodes to be increased, so that multiple secondary instance nodes can be quickly started in a case of a sudden fault to ensure smooth operation.

The troubleshooting configuration notification module implements a processing mechanism that is used when a health examination system detects that an instance node is faulty. Faults of two types of instance nodes are included herein: one is a fault of a conventional instance node, and the other is a fault of a secondary instance node with a minimum specification. When the conventional instance node is faulty, the troubleshooting configuration notification module instructs the cloud controller to start a secondary instance node, and quickly expands the secondary instance node to reach a specification of the conventional instance node; in this case, a quantity of minimum secondary instance nodes is correspondingly decreased by 1, that is, the cloud controller is instructed to create a minimum secondary instance node, and when the minimum secondary instance node is faulty, the same operation as what is performed when the conventional instance node is faulty is performed.

The cloud controller: manages an instance node and configures route distribution. Instance nodes of all cloud applications are distributed to specified application operating environments by the cloud controller. In an instance access manner, the cloud controller sends a policy to a route distribution system. As a general function system on the cloud platform, the cloud controller is not described in detail in the present disclosure.

The route distribution system: mainly controls an external access request to be distributed to an operating instance node of a corresponding application, receives a processing result of the instance node, and feeds back the result to user equipment that sends the access request. As a general function system on the cloud platform, the route distribution system is not described in detail in the present disclosure.

The health examination system: is responsible for checking a health status of instance nodes of all applications and instructing the secondary node management subsystem to perform fault recovery, create a minimum secondary instance node, and the like. As a general function system on the cloud platform, the health examination system is not described in detail in the present disclosure.

The application operating environment: the application operating environment on the cloud platform is mainly a carrier such as a virtual machine or a container, and an operating system, a software stack, and a resource such as a computing/storage/network resource that are required for operating an application are provided for normal operation of an instance of an application. As a general function system on the cloud platform, the application operating environment is not described in detail in the present disclosure.

In an embodiment of the present disclosure, for a procedure in which instance node management is implemented, there are two cases: initial deployment and fault occurrence, which can be understood with reference to the corresponding descriptions in FIG. 1 to FIG. 5 and is not excessively described herein.

It can be seen that in this embodiment of the present disclosure, the foregoing steps can ensure that a cloud application has a sufficient primary and secondary supporting capacity; in addition, a specification of a secondary instance node can be far less than that of a conventional instance node, which effectively reduces a resource waste caused by a requirement of high availability.

Figure 6:
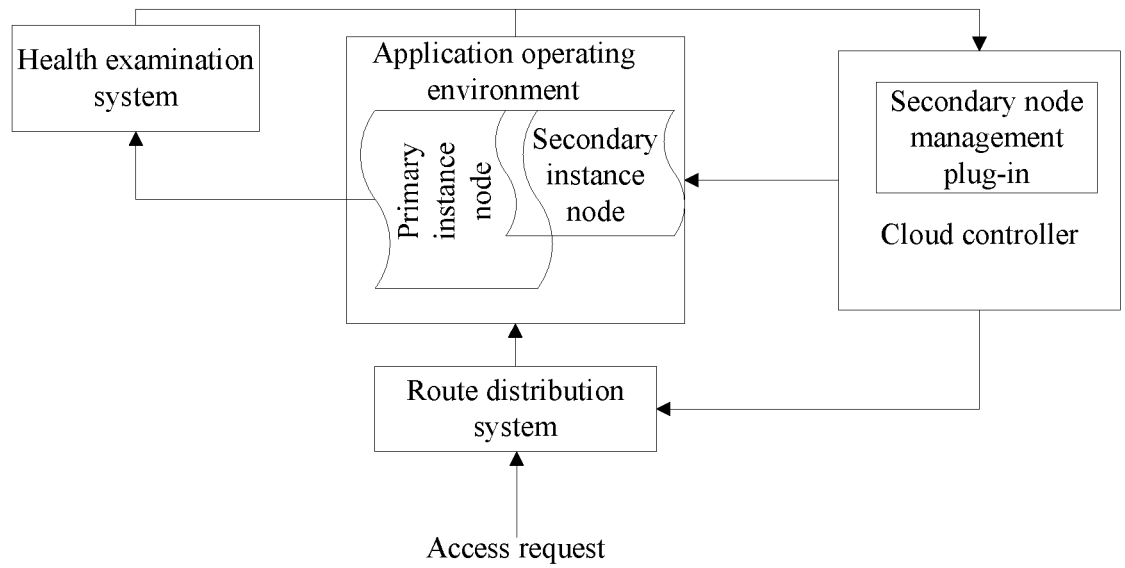
FIG. 6 is a schematic diagram of another embodiment of an instance node management method according to the embodiments of the present disclosure.

As shown in FIG. 6, another embodiment of instance node management in embodiments of the present disclosure is basically the same as the embodiment corresponding to FIG. 4 except for partial simplification in structure. A secondary node management subsystem may be included in a cloud controller in implementation, and is deployed together with the cloud controller in a manner of a plug-in/component or the like of the cloud controller.

In this embodiment, the cloud controller is first instructed to perform inter-system communication, and then the cloud controller allows a secondary node management plug-in to perform related processing. After computing/configuration is complete, a secondary node management subsystem can directly notify a router/an application operating environment or the like to perform route distribution management configuration and to implement creation/expansion or the like of a secondary instance node.

In a processing procedure, all processes of interaction between the cloud controller and the secondary node management subsystem are implemented within the cloud controller, which is similar to another procedure.

Further, simplification may further be performed on the secondary node management subsystem/plug-in. In most cases of implementation of a cloud application, a basic demand of high availability can be met provided that there is one secondary instance node. Therefore, a module for managing a secondary instance node of an application can be removed, where only fault handling and minimum-specification computing functions are retained.

When a fault occurs, a secondary node resource pool does not need to be determined or detected, a secondary instance node in the cloud application is directly converted into a conventional node, and a secondary instance node is created again.

Optionally, in another embodiment of an instance node management method provided by the embodiment of the present disclosure, a process of creating a cloud application for the first time is the same as that in the foregoing embodiment, but a difference lies in that: when a fault occurs and after a secondary instance node is converted into a conventional node, the cloud controller recovers a faulty conventional instance node instead of creating a secondary instance node again, and after recovery, a health examination system instructs the secondary node management subsystem to recycle a started secondary instance node, to recover the started secondary instance node. Alternatively, after the fault is repaired, a resource configuration specification of the repaired conventional instance node may be adjusted to a minimum resource configuration specification required by the application, so that the repaired conventional instance node becomes a secondary instance node of the application.

Optionally, in another embodiment of the instance node management method provided by the embodiment of the present disclosure, a dynamic adjustment method may be further added based on computing of a minimum specification of a secondary node and management of the secondary node. In a process of operating a conventional instance node, a minimum specification is dynamically computed according to an entire operating status, obtained by statistics collection, of the application, and specification refresh is performed in real time on a secondary instance node with a minimum specification in a current environment.

Optionally, in the method for creating an instance node with a minimum specification, considering that some applications may use massive temporary resources in initialization and starting processes while a quantity of occupied and consumed resources is lower after the initialization is complete, for a process of creating a minimum secondary instance node, an instance node with a complete specification is first created, and after starting is complete, the specification of the instance node is decreased to a minimum specification that is obtained by means of computing, so as to reduce resource consumption.

When a fault is being recovered, a conventional instance node is first recovered, the recovered conventional instance node is used as an instance node with a minimum specification, and a specification of the recovered conventional instance node is decreased to a minimum specification.

In addition, in this embodiment of the present disclosure, operating environments on the cloud platform may be different, such as a container or a virtual machine, and a difference exists in manners of implementing a secondary instance node with a minimum specification. In a technology in which a container is applied, the methods in the foregoing embodiments can be quickly implemented; in a technology in which a virtual machine is used, because a technology of longitudinal scale out/in regarding a virtual machine is immature, a method of longitudinal scale out/in and transverse scale out/in is used herein, that is, in a cloud environment meeting longitudinal scale out/in, the method in the foregoing embodiments is directly used, while in a cloud environment that does not meet longitudinal scale out/in, a transverse scale out/in mechanism is used. Creation of a secondary instance node is the same as that in the foregoing embodiment, but in use, a demand of temporary reliability is met by creating multiple secondary instance nodes, and after a conventional instance node is recovered, and then a temporarily generated secondary instance node is released, so as to ensure effective utilization of a resource.

Compared with the prior art in which a secondary instance node needs to occupy a same resource as a primary instance node to ensure high availability of an application on a cloud platform, on a basis of ensuring high availability of an application that is hosted on a cloud platform, the instance node management method provided by this embodiment of the present disclosure can reduce occupancy of a spare resource and increase an application hosting capability and scale on the cloud platform.

It should be noted that the solution in this embodiment of the present disclosure can not only be applied to a cloud platform, but also be applied to multiple scenarios in which application reliability needs to be improved other than the cloud platform.

Figure 7:
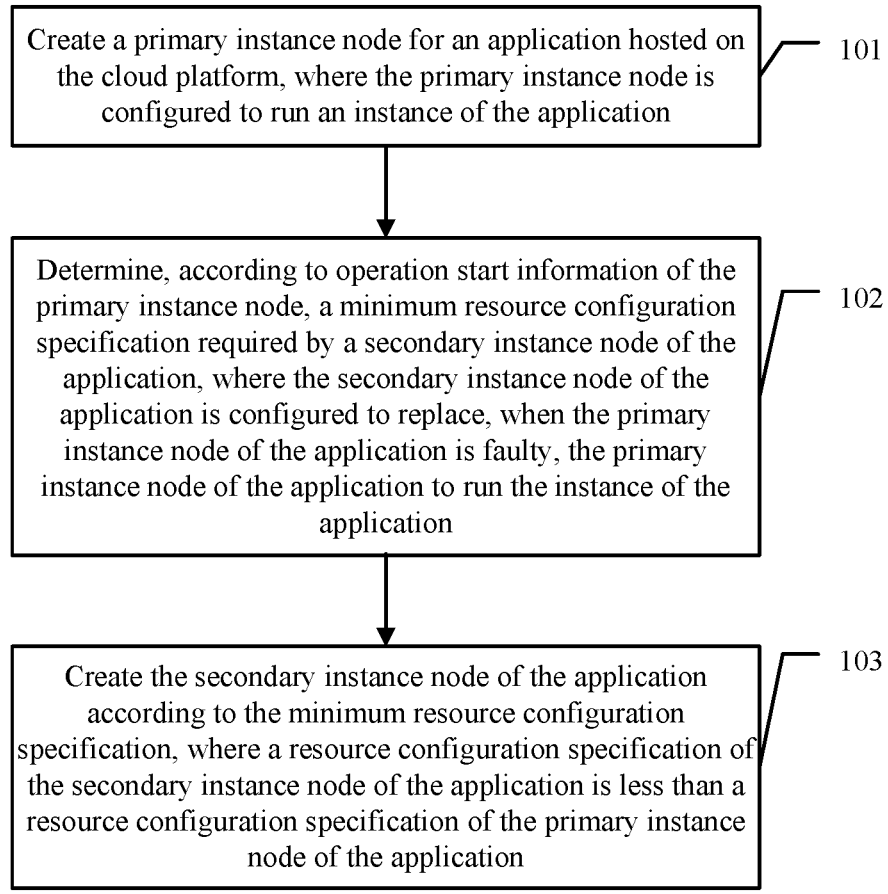
FIG. 7 is a schematic diagram of another embodiment of an instance node management method according to the embodiments of the present disclosure.

Referring to FIG. 7, an embodiment of an instance node management method provided by embodiments of the present disclosure includes:

101: Create a primary instance node for an application hosted on a cloud platform, where the primary instance node is configured to run an instance of the application.

The instance node management method provided by this embodiment of the present disclosure is applied to a management device of the cloud platform.

102: Determine, according to running start information of the primary instance node, a minimum resource configuration specification required by a secondary instance node of the application, where the secondary instance node is configured to replace, when the primary instance node is faulty, the primary instance node to run the instance of the application.

The running start information of the primary instance node may indicate a basic resource required for running the application, such as a core quantity of a CPU, a memory size, a hard disk size, or network bandwidth required when the primary instance node starts operating. The minimum resource configuration specification required by the secondary instance node may refer to specification information such as a core quantity of a CPU, a memory size, a hard disk size, and network bandwidth of the secondary instance node.

103: Create the secondary instance node according to the minimum resource configuration specification, where a resource configuration specification of the secondary instance node is less than a resource configuration specification of the primary instance node.

According to this embodiment of the present disclosure, a primary instance node is created for an application hosted on a cloud platform, where the primary instance node is configured to run an instance of the application; a minimum resource configuration specification required by a secondary instance node of the application is determined according to running start information of the primary instance node, where the secondary instance node is configured to replace, when the primary instance node is faulty, the primary instance node to run the instance of the application; and the secondary instance node is created according to the minimum resource configuration specification, where a resource configuration specification of the secondary instance node is less than a resource configuration specification of the primary instance node. Compared with the prior art in which a secondary instance node needs to occupy a same resource as a primary instance node to ensure high availability of an application on a cloud platform, on a basis of ensuring high availability of an application that is hosted on a cloud platform, the instance node management method provided by this embodiment of the present disclosure can reduce occupancy of a spare resource and increase an application hosting capability and scale on the cloud platform.

Optionally, on a basis of the embodiment corresponding to FIG. 7, in a first optional embodiment of an instance node management method provided by the embodiment of the present disclosure, after the creating the secondary instance node according to the minimum resource configuration specification, the method may further include:

when the primary instance node is faulty, adjusting the resource configuration specification of the secondary instance node to be the same as the resource configuration specification of the primary instance node, and setting the secondary instance node as a working instance node to replace the primary instance node to run the instance of the application.

The above method step may specifically comprise:

receiving a switch instruction that is generated when the primary instance node is faulty;

setting, according to the switch instruction, the secondary instance node as a working instance node that provides a service for access by user equipment; and adjusting a resource configuration specification of the working instance node to be the same as the resource configuration specification of the primary instance node.

In this embodiment of the present disclosure, when a primary instance node is normal, a resource occupancy rate of a secondary instance node is quite low; and when the primary instance node is faulty, the secondary instance node is quickly expanded to take over work of the primary instance node, so that an application access request is met, and an application hosting capacity and size on a cloud platform are increased.

Optionally, on a basis of the first optional embodiment of the foregoing instance node management method, in a second optional embodiment of the instance node management method provided by the embodiment of the present disclosure, after the adjusting a resource configuration specification of the working instance node to be the same as the resource configuration specification of the primary instance node, the method may further include:

creating a secondary instance node for the application again according to the minimum resource configuration specification.

In this embodiment of the present disclosure, when a quantity of minimum secondary instance nodes decreases, dynamic supplement is performed in a timely manner, which avoids that an application access request cannot be responded to when a working instance node is faulty next time, thereby improving reliability and user experience.

Optionally, on a basis of the first optional embodiment of the foregoing instance node management method, in a third optional embodiment of the instance node management method provided by the embodiment of the present disclosure, after the adjusting a resource configuration specification of the working instance node to be the same as the resource configuration specification of the primary instance node, the method may further include:

repairing the faulty primary instance node to obtain the repaired primary instance node; and adjusting a resource configuration specification of the repaired primary instance node to be the same as the minimum resource configuration specification, and setting the repaired primary instance node as the secondary instance node to replace, when the working instance node is faulty, the working instance node to run the instance of the application.

Optionally, the above method step may comprise:

repairing the faulty primary instance node;

switching, to the primary instance node, the working instance node that provides the service for the access by the user equipment; and adjusting the resource configuration specification of the working instance node to be the same as a minimum resource configuration specification required by the application.

In this embodiment of the present disclosure, a faulty primary instance node may be further repaired in a timely manner; in this case, a resource utilization rate of a cloud platform is further increased.

Optionally, on a basis of any embodiment of the foregoing instance node management method, in a fourth optional embodiment of the instance node management method provided by the embodiment of the present disclosure, after the determining a minimum resource configuration specification required by a secondary instance node of the application, the method may further include:

acquiring accesses of the application by the user equipment; and the creating the secondary instance node according to the minimum resource configuration specification includes:

creating at least two secondary instance nodes for the application according to the minimum resource configuration specification when the accesses of the application exceed a preset threshold, where a resource configuration specification of each created secondary instance node is the same as the minimum resource configuration specification.

In this embodiment of the present disclosure, minimum secondary instance nodes of a corresponding quantity can be created according to accesses of an application; in this case, a sudden and unexpected fault caused when application pressure is excessively high can be avoided, thereby further improving high availability of a cloud platform.

Optionally, on a basis of any embodiment of the foregoing instance node management method, in a fifth optional embodiment of the instance node management method provided by the embodiment of the present disclosure, after the creating the secondary instance node according to the minimum resource configuration specification, the method may further include:

monitoring the created secondary instance node of the application; and when it is learned, by detecting, that the secondary instance node is faulty, creating a secondary instance node having a same quantity as the faulty secondary instance node.

In this embodiment of the present disclosure, a faulty instance node in created secondary instance nodes may be further monitored in a timely manner, and a new available secondary instance node is created in a timely manner, so as to avoid that when a primary instance node is faulty, no available secondary instance node takes over work of the primary instance node, thereby further improving high availability of a cloud platform.

Optionally, on a basis of any embodiment of the foregoing instance node management method, in a sixth optional embodiment of the instance node management method provided by the embodiment of the present disclosure, after the creating the secondary instance node according to the minimum resource configuration specification, the method may further include:

detecting a resource quantity required for running the instance of the application; and adjusting the resource configuration specification of the created secondary instance node of the application according to the required resource quantity.

In this embodiment of the present disclosure, dynamic adjustment may be further performed on a resource configuration specification of a created secondary instance node according to a resource quantity required for operating an application; and if a quantity of resources required by the application is low, a resource may be further saved, and if the quantity of resources required by the application is high, takeover efficiency may be further improved when a primary instance node is faulty.

The embodiment corresponding to FIG. 7 and the optional embodiments corresponding to the embodiment can be understood with reference to the related descriptions in FIG. 1 to FIG. 6, and details are not described herein again.

It should be noted that functions of a first creating module 201, a second creating module 203, a first adjustment module 204, a repairing module 205, an acquiring module 206, a detection module 208, and a second adjustment module 209 that are involved in a process of describing a management device 20 of a cloud platform in the following are the same as the functions of the cloud controller described in the embodiments of FIG. 1 to FIG. 4, and functions implemented by a determining module 202 and a monitoring module 207 are the same as the functions of the secondary node management subsystem described in the embodiments of FIG. 1 to FIG. 4, where the determining module 202 may be the minimum-specification computing module in FIG. 5, and the monitoring module 207 may be the module for managing a secondary instance node of an application and the troubleshooting configuration notification module as described in FIG. 5.

Figure 8:
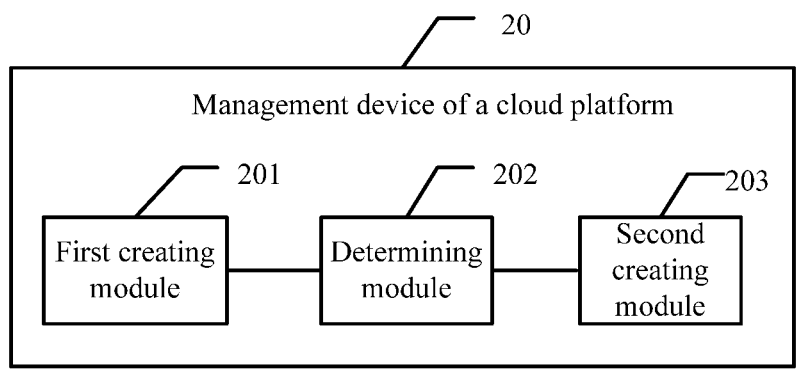
FIG. 8 is a schematic diagram of an embodiment of a management device according to the embodiments of the present disclosure.

Referring to FIG. 8, an embodiment of a management device 20 of a cloud platform provided by embodiments of the present disclosure includes:

a first creating module 201, configured to create a primary instance node for an application hosted on the cloud platform, where the primary instance node is configured to run an instance of the application;

a determining module 202, configured to determine, according to running start information of the primary instance node created by the first creating module 201, a minimum resource configuration specification required by a secondary instance node of the application, where the secondary instance node is configured to replace, when the primary instance node is faulty, the primary instance node to run the instance of the application; and a second creating module 203, configured to create the secondary instance node according to the minimum resource configuration specification determined by the determining module 202, where a resource configuration specification of the secondary instance node is less than a resource configuration specification of the primary instance node.

Compared with the prior art in which a secondary instance node needs to occupy a same resource as a primary instance node to ensure high availability of an application on a cloud platform, on a basis of ensuring high availability of an application that is hosted on a cloud platform, the management device 20 of the cloud platform provided by this embodiment of the present disclosure can reduce occupancy of a spare resource and increase an application hosting capability and scale on the cloud platform.

Figure 9:
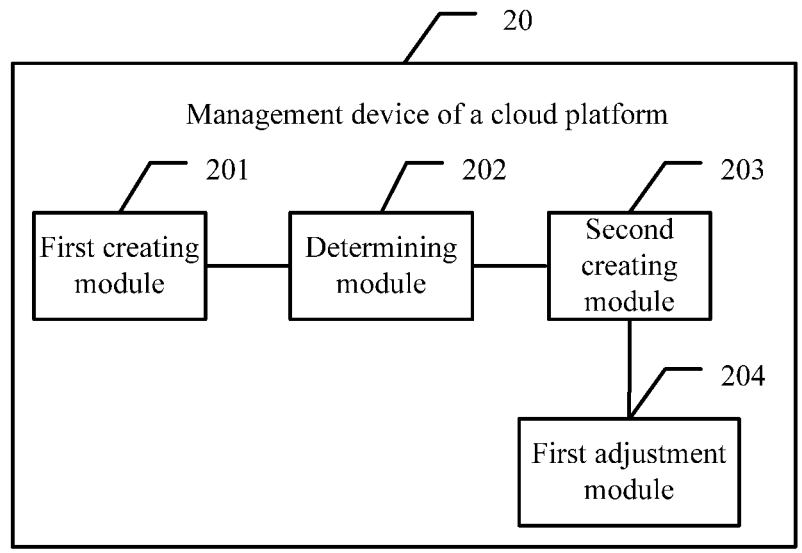
FIG. 9 is a schematic diagram of another embodiment of a management device according to the embodiments of the present disclosure.

Optionally, refer to FIG. 9 on a basis of the embodiment corresponding to FIG. 8. In a first optional embodiment of the management device 20 of the cloud platform provided by the embodiment of the present disclosure, the management device 20 further includes:

a first adjustment module 204, configured to: when the primary instance node is faulty, adjust the resource configuration specification of the secondary instance node, created by the second creating module 203, of the application to be the same as the resource configuration specification of the primary instance node, and set the secondary instance node as a working instance node to replace the primary instance node to run the instance of the application.

In this embodiment of the present disclosure, when a primary instance node is normal, a resource occupancy rate of a secondary instance node is quite low; and when the primary instance node is faulty, the secondary instance node is quickly expanded to take over work of the primary instance node, so that an application access request is met, and an application hosting capacity and size on a cloud platform are increased.

Optionally, on a basis of the embodiment corresponding to FIG. 9, in a second optional embodiment of the management device 20 of the cloud platform provided by the embodiment of the present disclosure, the second creating module 203 is further configured to create a secondary instance node for the application again according to the minimum resource configuration specification.

In this embodiment of the present disclosure, when a quantity of minimum secondary instance nodes decreases, dynamic supplement is performed in a timely manner, which avoids that an application access request cannot be responded to when a working instance node is faulty next time, thereby improving reliability and user experience.

Figure 10:
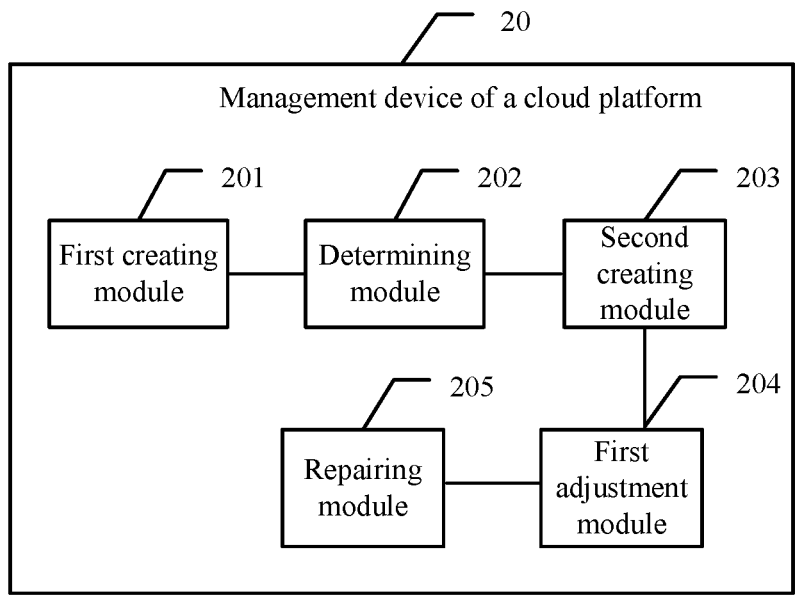
FIG. 10 is a schematic diagram of another embodiment of a management device according to the embodiments of the present disclosure.

Optionally, refer to FIG. 10 on a basis of the embodiment corresponding to FIG. 9. In a third optional embodiment of the management device 20 of the cloud platform provided by the embodiment of the present disclosure, the management device 20 further includes a repairing module 205.

The repairing module 205 is configured to repair the faulty primary instance node to obtain the repaired primary instance node.

The first adjustment module 204 is further configured to adjust a resource configuration specification of the primary instance node repaired by the repairing module 205 to be the same as the minimum resource configuration specification required by the application, and set the repaired primary instance node as the secondary instance node to replace, when the working instance node is faulty, the working instance node to run the instance of the application.

In this embodiment of the present disclosure, a faulty primary instance node may be further repaired in a timely manner; in this case, a resource utilization rate of a cloud platform is further increased.

Figure 11:
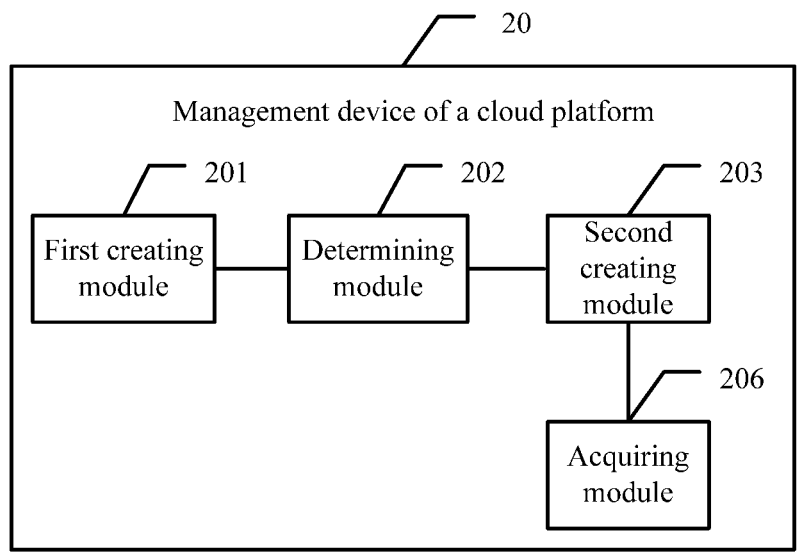
FIG. 11 is a schematic diagram of another embodiment of a management device according to the embodiments of the present disclosure.

Optionally, refer to FIG. 11 on a basis of any embodiment of the foregoing management device. In a fourth optional embodiment of the management device 20 of the cloud platform provided by the embodiment of the present disclosure, the management device 20 further includes an acquiring module 206.

The acquiring module 206 is configured to acquire accesses of the application by user equipment.

The second creating module 203 is specifically configured to: when the accesses acquired by the acquiring module 206, of the application exceed a preset threshold, create at least two secondary instance nodes for the application according to the minimum resource configuration specification determined by the determining module 202, where a resource configuration specification of each created secondary instance node is the same as the minimum resource configuration specification.

In this embodiment of the present disclosure, minimum secondary instance nodes of a corresponding quantity can be created according to accesses of an application; in this case, a sudden and unexpected fault caused when application pressure is excessively high can be avoided, thereby further improving high availability of a cloud platform.

Figure 12:
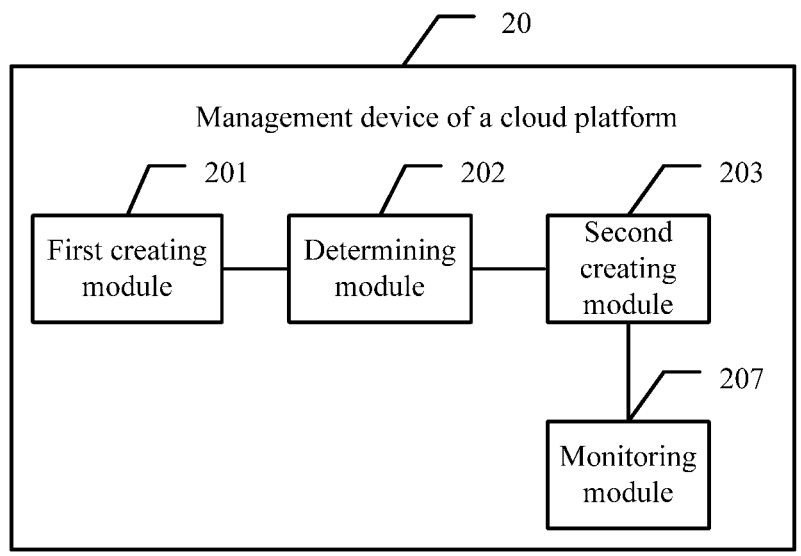
FIG. 12 is a schematic diagram of another embodiment of a management device according to the embodiments of the present disclosure.

Optionally, refer to FIG. 12 on a basis of any embodiment of the foregoing management device. In a fifth optional embodiment of the management device 20 of the cloud platform provided by the embodiment of the present disclosure, the management device 20 further includes a monitoring module 207.

The monitoring module 207 is configured to monitor the secondary instance node, created by the second creating module 203, of the application.

The second creating module 203 is further configured to: when the monitoring module 207 learns, by detecting, that the secondary instance node is faulty, create a secondary instance node having a same quantity as the faulty secondary instance node.

In this embodiment of the present disclosure, a faulty instance node in created secondary instance nodes may be further monitored in a timely manner, and a new available secondary instance node is created in a timely manner, so as to avoid that when a primary instance node is faulty, no available secondary instance node takes over work of the primary instance node, thereby further improving high availability of a cloud platform.

Figure 13:
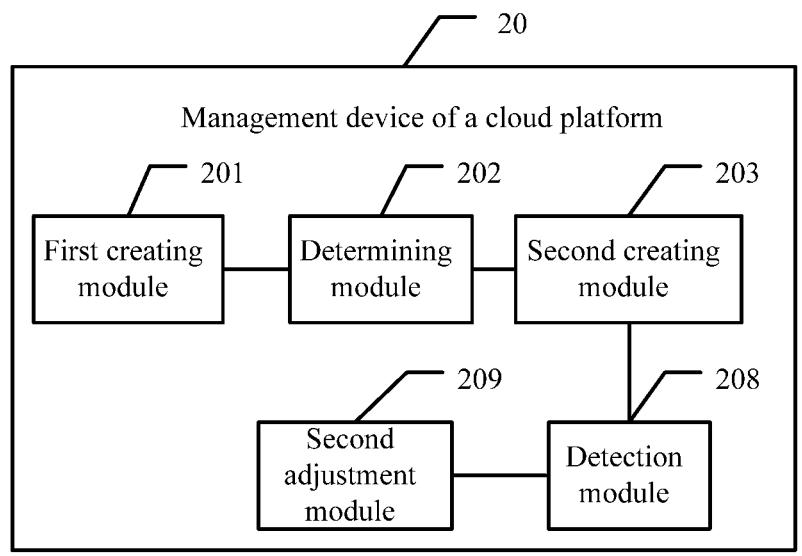
FIG. 13 is a schematic diagram of another embodiment of a management device according to the embodiments of the present disclosure.

Optionally, refer to FIG. 13 on a basis of any embodiment of the foregoing management device. In a sixth optional embodiment of the management device 20 of the cloud platform provided by the embodiment of the present disclosure, the management device 20 further includes a detection module 208 and a second adjustment module 209.

The detection module 208 is configured to detect a resource quantity required for running the instance of the application.

The second adjustment module 209 is configured to adjust the resource configuration specification of the created secondary instance node of the application according to the required resource quantity detected by the detection module 208.

In this embodiment of the present disclosure, dynamic adjustment may be further performed on a resource configuration specification of a created secondary instance node according to a resource quantity required for operating an application; and if a quantity of resources required by the application is low, a resource may be further saved, and if the quantity of resources required by the application is high, takeover efficiency may be further improved when a primary instance node is faulty.

The management device described in FIG. 8 to FIG. 13 can be understood with reference to the descriptions in FIG. 1 to FIG. 7, and details are not described herein again.

In the multiple embodiments of the foregoing management device, it should be understood that: in an implementation manner, a receiving module may be implemented by an input/output I/O device (for example, a network adapter), and a determining module, a first creating module, a second creating module, a first adjustment module, a repairing module, an acquiring module, a monitoring module, a detection module, and a second adjustment module may be implemented by a processor executing a program or an instruction in a memory (that is, by cooperation of a processor and a special instruction in a memory coupled with the processor); in another implementation manner, a receiving module may be implemented by an input/output I/O device (for example, a network adapter), and a determining module, a first creating module, a second creating module, a first adjustment module, a repairing module, an acquiring module, a monitoring module, a detection module, and a second adjustment module may also be implemented by using a specific circuit; for the specific implementation manner, refer to the prior art, and details are not described herein again; and in still another implementation manner, a receiving module may be implemented by an input/output I/O device (for example, a network adapter), and a determining module, a first creating module, a second creating module, a first adjustment module, a repairing module, an acquiring module, a monitoring module, a detection module, and a second adjustment module may also be implemented by using a field-programmable gate array (FPGA, Field-Programmable Gate Array; for the specific implementation manner, refer to the prior art, and details are not described herein again. The present disclosure includes but is not limited to the foregoing implementation manners. It should be understood that solutions implemented according to the idea of the present disclosure all fall within the protection scope of the embodiments of the present disclosure.

Figure 14:
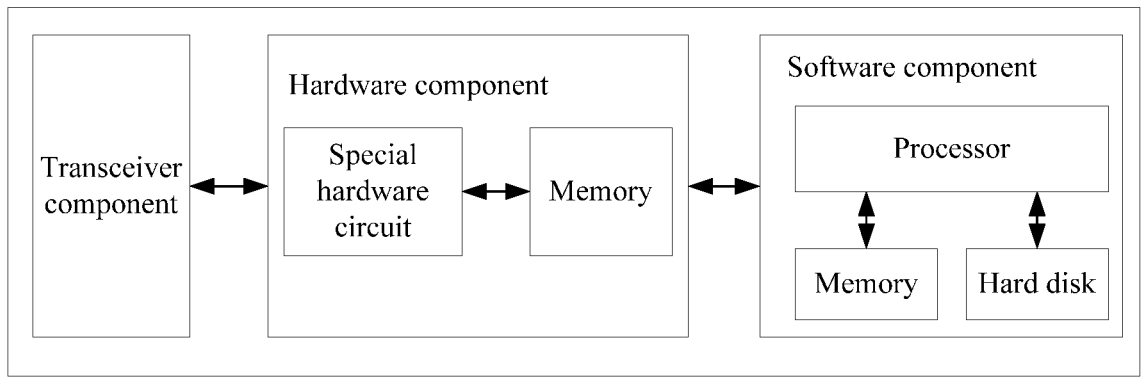
FIG. 14 is a schematic diagram of another embodiment of a management device according to the embodiments of the present disclosure.

Another embodiment provides a hardware structure of a management device. Referring to FIG. 14, a hardware structure of a management device may include three parts: a transceiver component, a software component, and a hardware component.

The transceiver component is a hardware circuit configured to complete packet receiving and sending.

The hardware component may also be referred to as a "hardware processing module", or more simply, may be short for "hardware". The hardware component mainly includes a hardware circuit that implements, based on a application-specific hardware circuit such as an FPGA and an ASIC (which may also coordinate with another matching component, for example, a memory), some specific functions; a processing speed of the hardware component is usually much higher than that of a general purpose processor, but it is difficult to change a function once the function is customized; therefore, the hardware component is inflexible in implementation and is usually configured to implement some specific functions. It should be noted that in an actual application, the hardware component may also include a processor such as an MCU (a microprocessor, for example, a single-chip microcomputer) or a CPU; however, a primary function of these processors is not to complete big data processing, but is mainly to perform control; in such application scenario, a system including these components is a hardware component.

The software component (or short for "software") mainly includes a general purpose processor (for example, a CPU) and some matching devices of the general purpose processor (for example, a storage device such as a memory or a hard disk). The processor may be enabled, by means of programming, to have a corresponding processing function. When the function is implemented by using software, the software component can be configured flexibly according to a service requirement, but a speed thereof is usually lower than that of the hardware component. After processing of the software is complete, the hardware component may send processed data by using the transceiver component, or may send processed data to the transceiver component over an interface connected to the transceiver component.

In this embodiment, the transceiver component is configured to receive a switch instruction in the foregoing embodiment, and the software component or hardware component is configured to perform APP registration, service quality control, or the like.

Other functions of the hardware component and the software component have been described in detail in the foregoing embodiments, and details are not described herein again.

The following describes in detail, with reference to the accompanying drawings, a technical solution in which a receiving module may be implemented by an input/output I/O device (for example, a network adapter), and a determining module, a first creating module, a second creating module, a first adjustment module, a repairing module, an acquiring module, a monitoring module, a detection module, and a second adjustment module may be implemented by a processor executing a program or an instruction in a memory.

Figure 15:
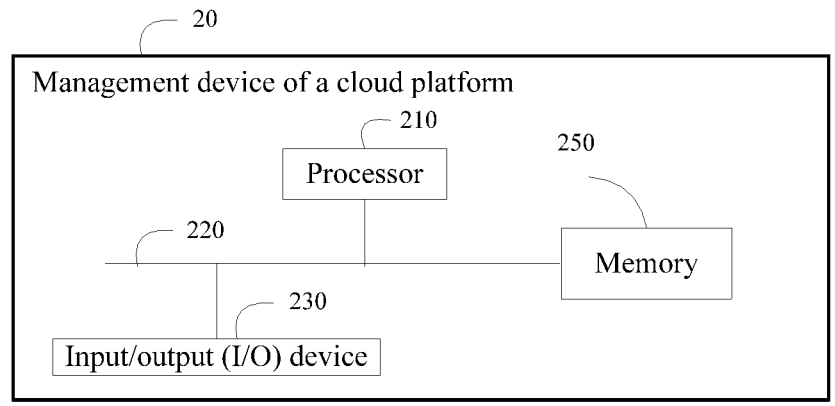
FIG. 15 is a schematic diagram of another embodiment of a management device according to the embodiments of the present disclosure.

FIG. 15 is a schematic structural diagram of a management device 20 provided by an embodiment of the present disclosure. The management device 20 includes a processor 210, a memory 250, and an input/output I/O device 230, where the memory 250 may include a read-only memory and a random access memory and provide an operation instruction and data for the processor 210. A part of the memory 250 may further include a non-volatile random access memory (NVRAM).

In some implementation manners, the memory 250 stores the following elements: an executable module or a data structure, or subsets thereof, or extension sets thereof.

In this embodiment of the present disclosure, an operation instruction stored in the memory 250 (the operation instruction may be stored in an operating system) is invoked to:

create a primary instance node for an application hosted on a cloud platform, where the primary instance node is configured to run an instance of the application;

determine, according to running start information of the primary instance node, a minimum resource configuration specification required by a secondary instance node of the application, where the secondary instance node is configured to replace, when the primary instance node is faulty, the primary instance node of the application to run the instance of the application; and create the secondary instance node according to the minimum resource configuration specification, where a resource configuration specification of the secondary instance node is less than a resource configuration specification of the primary instance node.

It can be seen that compared with the prior art in which a secondary instance node needs to occupy a same resource as a primary instance node to ensure high availability of an application on a cloud platform, on a basis of ensuring high availability of an application that is hosted on a cloud platform, the management device provided by this embodiment of the present disclosure can reduce occupancy of a spare resource and increase an application hosting capability and scale on the cloud platform.

The processor 210 controls an operation of the management device 20, and the processor 210 may also be referred to as a CPU (Central Processing Unit, central processing unit). The memory 250 may include a read-only memory and a random access memory and provide an instruction and data for the processor 210. A part of the memory 250 may further include a non-volatile random access memory (NVRAM). In a specific application, all components of the management device 20 are coupled together by using a bus system 220, where in addition to including a data bus, the bus system 220 may further include a power bus, a control bus, a status signal bus, and the like. However, for clear description, all kinds of buses are marked as the bus system 220 in the figure.

The methods disclosed in the foregoing embodiments of the present disclosure may be applied to the processor 210, or may be implemented by the processor 210. The processor 210 may be an integrated circuit chip and has a signal processing capability. In an implementation process, all steps of the foregoing methods may be completed by using an integrated logic circuit of hardware in the processor 210 or by using an instruction in a software form. The foregoing processor 210 may be a general purpose processor, a digital signal processor (DSP), an application-specific integrated circuit (ASIC), a field-programmable gate array (FPGA) or another programmable logic device, a discrete gate or transistor logic device, or a discrete hardware component, and can implement or execute the methods, steps, and logic block diagrams disclosed in this embodiment of the present disclosure. The general purpose processor may be a microprocessor, or the processor may be any conventional processor or the like. The steps of the methods disclosed with reference to the embodiments of the present disclosure may be executed and completed by a hardware encoding processor, or may be executed and completed by using a combination of hardware and software modules in an encoding processor. The software module may be located in a storage medium mature in the art such as a random access memory, a flash memory, a read-only memory, a programmable read-only memory, an electrically erasable programmable memory, or a register. The storage medium is located in the memory 250, the processor 210 reads information in the memory 250, and the steps of the foregoing methods are completed with reference to hardware of the processor 210.

Optionally, the processor 210 is further configured to: when the primary instance node is faulty, adjust the resource configuration specification of the secondary instance node to be the same as the resource configuration specification of the primary instance node, and set the secondary instance node as a working instance node to replace the primary instance node to run the instance of the application.

In this embodiment of the present disclosure, when a primary instance node is normal, a resource occupancy rate of a secondary instance node is quite low; and when the primary instance node is faulty, the secondary instance node is quickly expanded to take over work of the primary instance node, so that an application access request is met, and an application hosting capacity and size on a cloud platform are increased.

Optionally, the processor 210 is further configured to create a secondary instance node for the application again according to the minimum resource configuration specification.

In this embodiment of the present disclosure, when a quantity of minimum secondary instance nodes decreases, dynamic supplement is performed in a timely manner, which avoids that an application access request cannot be responded to when a working instance node is faulty next time, thereby improving reliability and user experience.

Optionally, the processor 210 is further configured to: repair the faulty primary instance node to obtain the repaired primary instance node; and adjust a resource configuration specification of the repaired primary instance node to be the same as the minimum resource configuration specification, and set the repaired primary instance node as the secondary instance node to replace, when the working instance node is faulty, the working instance node to run the instance of the application.

In this embodiment of the present disclosure, a faulty primary instance node may be further repaired in a timely manner; in this case, a resource utilization rate of a cloud platform is further increased.

Optionally, the processor 210 is further configured to: acquire accesses of the application by user equipment; and create at least two secondary instance nodes for the application according to the minimum resource configuration specification when the accesses of the application exceed a preset threshold, where a resource configuration specification of each created secondary instance node is the same as the minimum resource configuration specification.

In this embodiment of the present disclosure, minimum secondary instance nodes of a corresponding quantity can be created according to accesses of an application; in this case, a sudden and unexpected fault caused when application pressure is excessively high can be avoided, thereby further improving high availability of a cloud platform.

Optionally, the processor 210 is further configured to: monitor the created secondary instance node of the application; and when it is learned, by detecting, that the secondary instance node is faulty, create a secondary instance node having a same quantity as the faulty secondary instance node.

In this embodiment of the present disclosure, a faulty instance node in created secondary instance nodes may be further monitored in a timely manner, and a new available secondary instance node is created in a timely manner, so as to avoid that when a primary instance node is faulty, no available secondary instance node takes over work of the primary instance node, thereby further improving high availability of a cloud platform.

Optionally, the processor 210 is further configured to: detect a resource quantity required for running the instance of the application; and adjust the resource configuration specification of the created secondary instance node of the application according to the required resource quantity.

In this embodiment of the present disclosure, dynamic adjustment may be further performed on a resource configuration specification of a created secondary instance node according to a resource quantity required for operating an application; and if a quantity of resources required by the application is low, a resource may be further saved, and if the quantity of resources required by the application is high, takeover efficiency may be further improved when a primary instance node is faulty.

Figure 16:
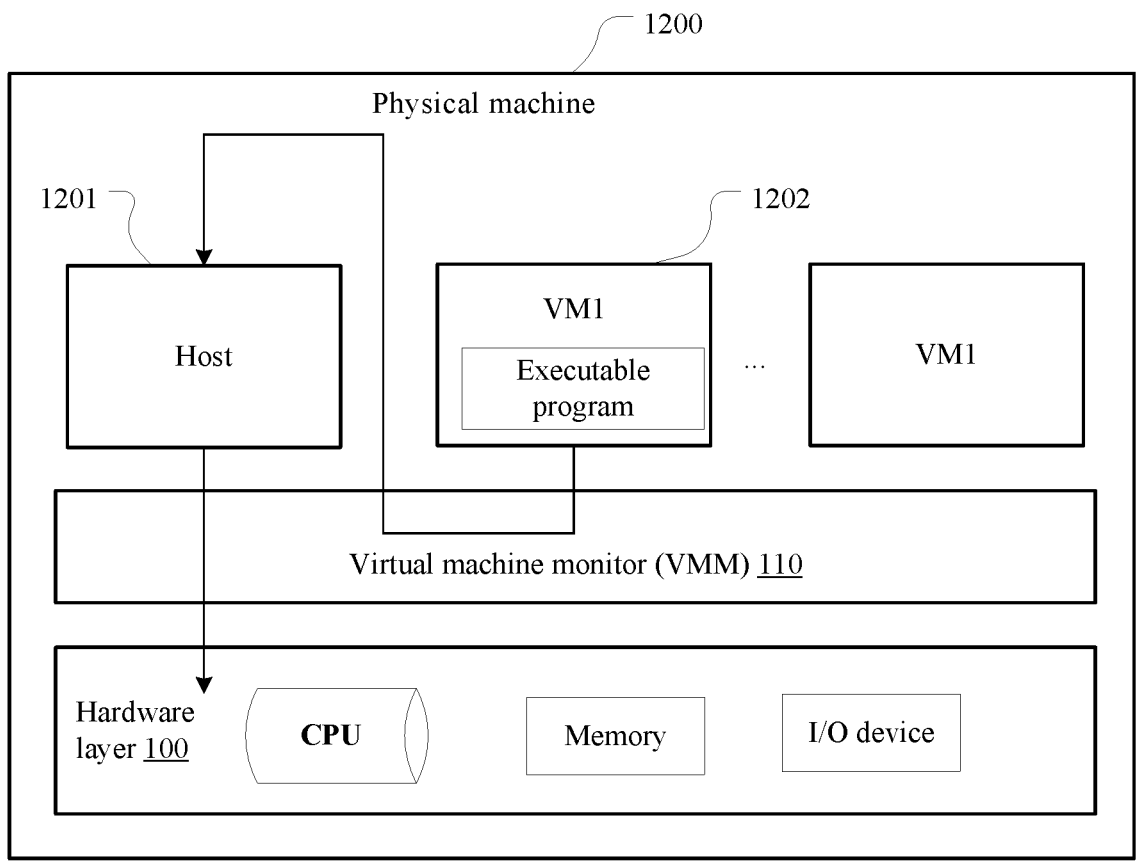
FIG. 16 is a schematic diagram of another embodiment of a management device according to the embodiments of the present disclosure.

It should be noted that a management device of a cloud platform according to an embodiment of the present disclosure may be specifically a cloud host in a cloud computing system, where the cloud host may be a virtual machine running on a physical machine. As shown in FIG. 16, a physical machine 1200 includes a hardware layer 100, a VMM (Virtual Machine Monitor, virtual machine monitor) 110 running at the hardware layer 100, and several virtual machines (VM, Virtual Machine) and a host machine Host 1201 that run on the VMM 110, where the hardware layer includes but is not limited to an I/O device, a CPU, and a memory. The management device of a cloud platform provided by this embodiment of the present disclosure may be specifically a virtual machine in a physical machine 1200, for example, a VM 1202. One or more cloud applications run on the VM 1202, where each cloud application is used to implement a corresponding service function, such as a database application or a map application. These applications may be developed by a developer and then deployed in the cloud computing system. In addition, an executable program further runs on the VM 1202. The VM 1202 runs the executable program and invokes, in a program running process, a hardware resource of the hardware layer 100 by using the host machine Host 1201, so as to implement functions of a determining module, a first creating module, a second creating module, a first adjustment module, a repairing module, an acquiring module, a monitoring module, a detection module, and a second adjustment module of the management device of the cloud platform. Specifically, the determining module, the first creating module, the second creating module, the first adjustment module, the repairing module, the acquiring module, the monitoring module, the detection module, and the second adjustment module may be included in the foregoing executable program in a form of a software module or a function. For example, the executable program may include the determining module, the first creating module, the second creating module, the first adjustment module, the repairing module, the acquiring module, the monitoring module, the detection module, and the second adjustment module. The VM 1202 invokes a resource such as a CPU or a memory of the hardware layer 100 to run the executable program, so as to implement the functions of the determining module, the first creating module, the second creating module, the first adjustment module, the repairing module, the acquiring module, the monitoring module, the detection module, and the second adjustment module.

The embodiment corresponding to FIG. 15 and the other optional embodiments can be understood with reference to the descriptions in FIG. 1 to FIG. 13, and details are not described herein again.

A person of ordinary skill in the art may understand that all or some of the steps of the methods in the embodiments may be implemented by a program instructing relevant hardware (such as a processor). The program may be stored in a computer-readable storage medium. The storage medium may include: a ROM, a RAM, a magnetic disk, or an optical disc.

The foregoing describes in detail the instance node management method and the management device that are provided by the embodiments of the present disclosure. In this specification, specific examples are used to elaborate a principle and an implementation manner of the present disclosure. The description of the foregoing embodiments is only intended to help understand the method of the present disclosure and its core ideas. In addition, a person of ordinary skill in the art may, based on the idea of the present disclosure, make modifications with respect to the specific implementation manners and the application scope. Therefore, the content of this specification shall not be construed as a limitation to the present disclosure.

What is claimed is:

1. An instance node management method, wherein the method is applied to a management device of a cloud platform, and the method comprising:
   creating a primary instance node for an application hosted on the cloud platform, wherein the primary instance node is configured to run an instance of the application;
   determining, according to running start information of the primary instance node, a minimum resource configuration specification required by a secondary instance node of the application, wherein the secondary instance node is configured to replace the primary instance node to run the instance of the application when the primary instance node is faulty; and
   creating the secondary instance node according to the minimum resource configuration specification, wherein a resource configuration specification of the created secondary instance node is less than a resource configuration specification of the created primary instance node.

2. The method according to claim 1, wherein the method further comprises:
   when the primary instance node is faulty, adjusting the resource configuration specification of the secondary instance node to be the same as the resource configuration specification of the primary instance node, and setting the secondary instance node as a working instance node to replace the primary instance node to run the instance of the application.

3. The method according to claim 2, wherein after the adjusting the resource configuration specification of the secondary instance node to be the same as the resource configuration specification of the primary instance node, the method further comprises:
  creating a secondary instance node for the application again according to the minimum resource configuration specification.

4. The method according to claim 2, wherein after the adjusting the resource configuration specification of the secondary instance node to be the same as the resource configuration specification of the primary instance node, the method further comprises:
  repairing the faulty primary instance node to obtain the repaired primary instance node; and
  adjusting a resource configuration specification of the repaired primary instance node to be the same as the minimum resource configuration specification, and setting the repaired primary instance node as the secondary instance node of the application to replace, when the working instance node is faulty, the working instance node to run the instance of the application.

5. The method according to claim 1, wherein after the determining a minimum resource configuration specification required by a secondary instance node of the application, the method further comprises:
  acquiring accesses of the application by user equipment; and
  the creating the secondary instance node according to the minimum resource configuration specification comprises:
  creating at least two secondary instance nodes for the application according to the minimum resource configuration specification when the accesses of the application exceed a preset threshold, wherein a resource configuration specification of each created secondary instance node is the same as the minimum resource configuration specification.

6. The method according to claim 1, wherein after the creating the secondary instance node according to the minimum resource configuration specification, the method further comprises:
  monitoring the created secondary instance node of the application; and
  when it is learned, by detecting, that the secondary instance node is faulty, creating a secondary instance node having a same quantity as the faulty secondary instance node.

7. The method according to claim 1, wherein after the creating the secondary instance node according to the minimum resource configuration specification, the method further comprises:
  detecting a resource quantity required for running the instance of the application; and
  adjusting the resource configuration specification of the created secondary instance node of the application according to the required resource quantity.

8. A management device of a cloud platform, wherein the management device comprising:
  a memory;
  a processor in communication with the memory and configured to execute instructions stored in the memory to:
    create a primary instance node for an application hosted on the cloud platform, wherein the primary instance node is configured to run an instance of the application;
    determine, according to running start information of the primary instance node created, a minimum resource configuration specification required by a secondary instance node of the application, wherein the secondary instance node is configured to replace the primary instance node to run the instance of the application when the primary instance node is faulty; and
    create the secondary instance node according to the minimum resource configuration specification determined, wherein a resource configuration specification of the created secondary instance node is less than a resource configuration specification of the created primary instance node.

9. The management device according to claim 8, wherein the processor is further configured to:
  adjust the resource configuration specification of the secondary instance node created to be the same as the resource configuration specification of the primary instance node when the primary instance node is faulty, and set the secondary instance node as a working instance node to replace the primary instance node to run the instance of the application.

10. The management device according to claim 9, wherein the processor is further configured to:
  create a secondary instance node for the application again according to the minimum resource configuration specification.

11. The management device according to claim 9, wherein the processor is further configured to:
  repair the faulty primary instance node to obtain the repaired primary instance node; and
  adjust a resource configuration specification of the repaired primary instance node to be the same as the minimum resource configuration specification required by the application, and set the repaired primary instance node as the secondary instance node of the application to replace the working instance node to run the instance of the application when the working instance node is faulty.

12. The management device according to claim 8, wherein the processor is further configured to:
  acquire accesses of the application by user equipment; and
  when the accesses of the application exceed a preset threshold, create at least two secondary instance nodes for the application according to the minimum resource configuration specification determined by the determining module, wherein a resource configuration specification of each created secondary instance node is the same as the minimum resource configuration specification.

13. The management device according to claim 8, wherein the processor is further configured to:
  monitor the secondary instance node created; and
  when the secondary instance node is faulty, create a secondary instance node having a same quantity as the faulty secondary instance node.

14. The management device according to claim 8, wherein the processor is further configured to:
  detect a resource quantity required for running the instance of the application; and
  adjust the resource configuration specification of the created secondary instance node of the application according to the required resource quantity detected.

15. A non-transitory computer-readable storage medium storing instructions that when executed by a processor cause the processor to:

create a primary instance node for an application hosted on the cloud platform, wherein the primary instance node is configured to run an instance of the application;

determine, according to running start information of the primary instance node created, a minimum resource configuration specification required by a secondary instance node of the application, wherein the secondary instance node is configured to replace the primary instance node to run the instance of the application when the primary instance node is faulty; and create the secondary instance node according to the minimum resource configuration specification determined, wherein a resource configuration specification of the created secondary instance node is less than a resource configuration specification of the created primary instance node.

* * * * *